(12) United States Patent
Sun et al.

(10) Patent No.: US 12,411,294 B2
(45) Date of Patent: Sep. 9, 2025

(54) SMALL FORM-FACTOR PLUGGABLE TRANSCEIVER

(71) Applicant: JESS-LINK PRODUCTS CO., LTD., New Taipei (TW)

(72) Inventors: Chi-Hsien Sun, New Taipei (TW); Hsu-Feng Chang, New Taipei (TW); Ching-Hung Liu, New Taipei (TW); Chieh-Ming Cheng, New Taipei (TW)

(73) Assignee: JESS-LINK PRODUCTS CO., LTD., New Taipei (TW)

( * ) Notice: Subject to any disclaimer, the term of this patent is extended or adjusted under 35 U.S.C. 154(b) by 734 days.

(21) Appl. No.: 17/735,596

(22) Filed: May 3, 2022

(65) Prior Publication Data
US 2023/0266547 A1    Aug. 24, 2023

(30) Foreign Application Priority Data
Feb. 22, 2022  (TW) .................................. 111106426

(51) Int. Cl.
*G02B 6/42* (2006.01)
*H01R 13/35* (2006.01)
*H01R 24/64* (2011.01)

(52) U.S. Cl.
CPC ......... *G02B 6/4278* (2013.01); *G02B 6/4246* (2013.01); *G02B 6/4292* (2013.01);
(Continued)

(58) Field of Classification Search
CPC .................................................... H04B 10/40
See application file for complete search history.

(56) References Cited

U.S. PATENT DOCUMENTS 8,295,337 B2 * 10/2012 Luo ........................ H04B 10/40
                                                              375/224
10,164,706 B2 * 12/2018 Tang .................. H04B 10/2581
(Continued)

FOREIGN PATENT DOCUMENTS

CN          106100674 A      11/2016
CN          108337095 A       7/2018
(Continued)

OTHER PUBLICATIONS

Office Action dated Nov. 18, 2022 of the corresponding Taiwan patent application No. 111106426.

*Primary Examiner* — Nathan M Cors
(74) *Attorney, Agent, or Firm* — Chun-Ming Shih; HDLS IPR SERVICES

(57) ABSTRACT

A small form-factor pluggable transceiver is coupled to a cable connector and a network device. The small form-factor pluggable transceiver includes a first connection port, a conversion unit, a transceiver unit, and a second connection port. The conversion unit includes a bandwidth indication pin, and the transceiver unit includes a detection pin. The transceiver unit operates in a normal state based on providing a first voltage level by the detection pin, and operates in an abnormal state based on providing the second voltage level by the detection pin. The bandwidth indication pin indicates that a signal source received by the first connection port is a copper cable-type signal source, and indicates that a rate of the signal source is an invalid rate. The detection pin provides the first voltage level based on the invalid rated by being coupled to a ground point.

10 Claims, 4 Drawing Sheets

(52) U.S. Cl.
CPC ............ *H01R 13/35* (2013.01); *H01R 24/64* (2013.01); *H01R 2201/04* (2013.01)

(56) References Cited

U.S. PATENT DOCUMENTS

2020/0204259 A1\* 6/2020 Son ........................ H04B 10/66
2022/0236502 A1\* 7/2022 Margolin ............. G02B 6/4284

FOREIGN PATENT DOCUMENTS

| CN | 212064011 U | 12/2020 |
| TW | 201203942 A | 1/2012 |

\* cited by examiner

SMALL FORM-FACTOR PLUGGABLE TRANSCEIVER

BACKGROUND

Technical Field

The present disclosure relates to a small form-factor pluggable transceiver, and more particularly to a small form-factor pluggable transceiver with support for copper cable transmission.

Description of Related Art

The statements in this section merely provide background information related to the present disclosure and do not necessarily constitute prior art.

Due to the increasing popularity of key network systems (such as servers, central control systems, etc.) in the present network equipment field, more and more attention is paid to the signal transmission arrangement for network systems. Especially using optical fiber transmission, the light transmission in these fibers can be used to transmit light by the principle of total internal reflection so that optical fiber transmission has the advantage of high transmission speed. Therefore, the transceiver equipment for optical fiber transmission is derived. In particular, the transmission application of small form-factor pluggable transceiver (SFP) has attracted the attention of the industry. The small form-factor pluggable transceiver is a small hot-pluggable optical transceiver, used for optical communication applications in telecommunication and data communication, mainly used in mainboards of switches, routers and other devices and optical fibers of optical fibers or UTP cables transmission.

However, the small form-factor pluggable transceiver is generally not suitable for copper cables, that is because the transmission rate of copper cable (usually lower than 10 Gbps) is much lower than that of fiber optic cables (usually higher than 10 Gbps). However, copper cables usually have the advantages of stable and reliable structure and low price. If it is used in occasions where the transmission rate does not need to be too high, although the use of copper cables as signal transmission is more cost-effective. However, since the small form-factor pluggable transceiver is not compatible with copper cables, it is often necessary to replace the small form-factor pluggable transceiver with other transceiver devices in order to use copper cables for connection, resulting in poor compatibility.

Therefore, the present disclosure is provided to design a small form-factor pluggable transceiver with the function of supporting copper cable transmission so that the small form-factor pluggable transceiver can be compatible with the cooper cable-type signal source.

SUMMARY

In order to solve the above-mentioned problems, the present disclosure provides a small form-factor pluggable transceiver. The small form-factor pluggable transceiver is couple to a cable connector and a network device. The small form-factor pluggable transceiver includes a first connection port, a conversion unit, a transceiver unit, and a second connection port. The first connection port connects to the cable connector, and transmits and receives a signal source provided by the cable connector. The conversion unit is coupled to the first connection port, and converts the signal source into an Ethernet frame. The conversion unit includes a bandwidth indication pin. The bandwidth indication pin indicates a rate of the signal source. The transceiver unit is coupled to the conversion unit, and bidirectionally transmits the Ethernet frame. The transceiver unit includes a detection pin. The detection pin is coupled to the bandwidth indication pin, and is adjusted to a first voltage level based on that the rate is a valid rate and is adjusted to a second voltage level based on that the rate is an invalid rate. The second connection port is coupled to the transceiver unit, and connects with the network device. The transceiver unit operates in a normal state based on providing the first voltage level by the detection pin, and operates in an abnormal state based on providing the second voltage level by the detection pin. The detection pin is coupled to a ground point, and the bandwidth indication pin indicates that the rate is the invalid rate based on the signal source being a copper cable-type signal source, and the detection pin provides the first voltage level based on the invalid rate by being coupled to the ground point.

In one embodiment, the small form-factor pluggable transceiver further includes a resistor. The resistor is coupled between the detection pin and the ground point, and limits a current flowing from the detection pin to the ground point.

In one embodiment, the transceiver unit is a network physical layer transceiver chip, and the transceiver unit is compatible with the copper cable-type signal source based on the detection pin being coupled to the ground point.

In one embodiment, the conversion unit is a port physical layer chip.

In one embodiment, the rate of the cooper cable-type signal source is less than 10 Gbps, and the valid rate is greater than 10 Gbps.

In one embodiment, the first voltage level is less than 0.8 volts, and the second voltage level is greater than 2.4 volts.

In one embodiment, the first connection port is an RJ-45, an SC, an ST, a MT-RJ, or an LC.

In one embodiment, the cable connector is coupled to a copper cable or a twisted pair cable.

In one embodiment, the network device is a router, a switch, an optical transceiver, or an optical transmitter and receiver.

In one embodiment, the small form-factor pluggable transceiver is located inside the network device, or is located outside the network device.

The main purpose and effect of the present disclosure is that the detection pin is coupled to the ground point, and when the copper cable is used to connect with the small form-factor pluggable transceiver, the bandwidth indication pin indicates that the rate is invalid based on the signal source being a cooper cable-type signal source, and the detection pin provides the first voltage level based on the invalid rate so that the small form-factor pluggable transceiver is compatible with the cooper cable-type signal source.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
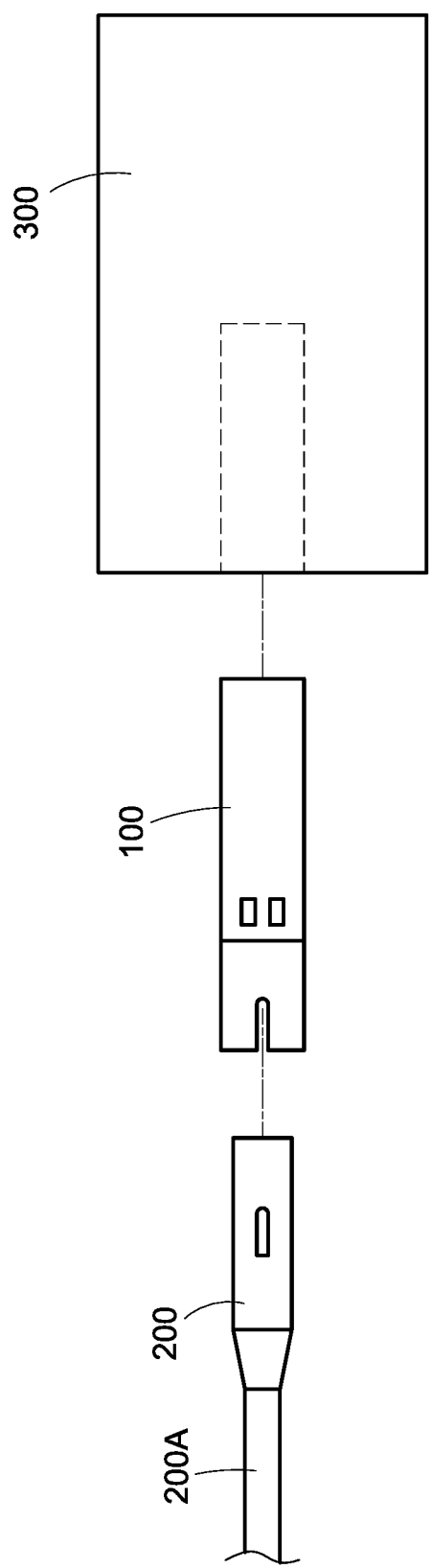
FIG. 1 is a schematic diagram of a small form-factor pluggable transceiver with support for copper cable transmission according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a schematic diagram of a small form-factor pluggable transceiver with support for copper cable transmission according to the present disclosure. The small form-factor pluggable transceiver 100 is coupled to a cable connector 200 and a network device 300, and the cable connector 200 is coupled to a cable 200A. The small form-factor pluggable transceiver 100 is mainly used for optical communication applications in telecommunication and data communication, and is configured to transmit and receive data/signals bidirectionally between the cable 200A and the network device 300. In particular, the network device may be a network communication device such as a router, a switch, an optical transceiver, or an optical transmitter and receiver, and the cable 200A may be a copper cable or a twisted pair cable. The twisted pair cable may be, for example, but not limited to a general network wire, and the copper cable may be, for example, but not limited to, an active or passive copper cable (direct attach cable, DAC).

Furthermore, the small form-factor pluggable transceiver 100 is mainly an optical transceiver, and the conventional technology usually uses optical fiber cable coupling so that the small form-factor pluggable transceiver 100 can bidirectionally transmit the optical signal of the optical fiber cable. However, the small form-factor pluggable transceiver 100 is generally not suitable for copper cables since the transmission rate of copper cables (usually is less than 10 Gbps) is much lower than that of fiber optic cables (usually is higher than 10 Gbps). When the optical fiber cable is used to connect with the small form-factor pluggable transceiver 100, the small form-factor pluggable transceiver 100 can identify the connected cable 200A as an optical fiber cable, and operate in a normal state to normally transmit and receive data/signals. On the contrary, when the small form-factor pluggable transceiver 100 is connected with a copper cable, the small form-factor pluggable transceiver 100 cannot identify the connected cable 200A, and is operated in an abnormal state so that data/signal transmission and reception cannot be normally performed.

Figure 2:
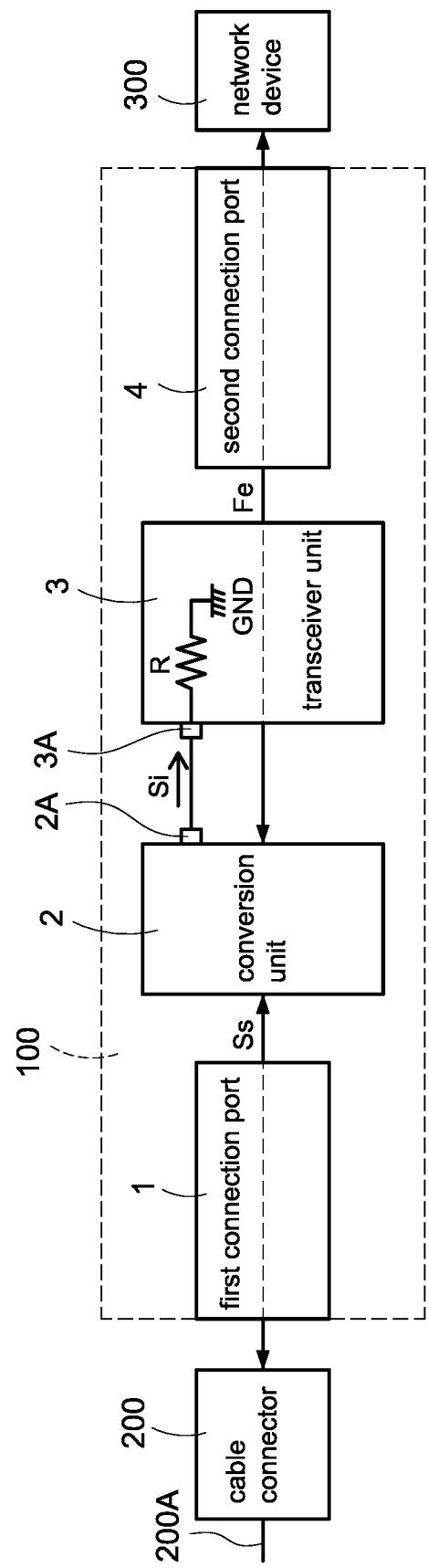
FIG. 2 is a block diagram of the small form-factor pluggable transceiver with support for copper cable transmission according to the present disclosure.

Please refer to FIG. 2, which shows a block diagram of the small form-factor pluggable transceiver with support for copper cable transmission according to the present disclosure, and also refer to FIG. 1. The small form-factor pluggable transceiver 100 includes a first connection port 1, a conversion unit 2, a transceiver unit 3, and a second connection port 4. The first connection port 1 is used to couple to the cable 200A by connecting with the cable connector 200 so as to receive a signal source Ss provided from the cable connector 200. According to the connector type of the cable connector 200, the first connection port may be an RJ-45, an SC, an ST, a MT-RJ, or an LC connection port. The conversion unit 2 is coupled to the first connection port 1, and the conversion unit 2 includes a bandwidth indication pin 2A, for example, but not limited to LED_LINK100, LED_LINK1000, etc. The conversion unit 2 is a chip of the physical layer (port physical layer, PHY, which may be called a port physical layer), and is used to convert the signal source Ss into an Ethernet frame Fe, which may be called an Ethernet data frame. The conversion unit 2 transmits and receives the Ethernet frame Fe, and the bandwidth indication pin 2A is used to indicate the rate of the signal source Ss when it is successfully matched with the cable 200A (that is, to provide a rate signal Si corresponding to the transmission rate). In other words, when the optical fiber cable is used to connect to the small form-factor pluggable transceiver 100, the small form-factor pluggable transceiver 100 is successfully matched with the cable 200A, and the bandwidth indication pin 2A indicates the rate of the signal source Ss, for example, but not limited to 15 Gbps or 20 Gbps. On the contrary, when the small form-factor pluggable transceiver 100 is connected with the copper cable, the small form-factor pluggable transceiver 100 and the cable 200A are not correctly matched, and the bandwidth indication pin 2A cannot indicate the rate of the signal source Ss and it is the low voltage level.

The transceiver unit 3 is coupled to the conversion unit 2, and the transceiver unit 3 includes a detection pin 3A (loss of signal, LOS). The transceiver unit 3 is a transceiver chip of the small form-factor pluggable transceiver 100, which is mainly used in the network physical layer transceiver chip for optical fiber transceiver, and is used for bidirectional transmission of Ethernet frame Fe between the conversion unit 2 and the network device 300. The detection pin 3A is coupled to the bandwidth indication pin 2A to receive an indication provided from the bandwidth indication pin 2A. Specifically, when the bandwidth indication pin 2A indicates that the rate of the signal source Ss is a valid rate (i.e., the rate is higher than 10 Gbps), the detection pin 3A adjusts its own voltage level to a first voltage level, for example, but not limited to a low voltage level. On the contrary, when the bandwidth indication pin 2A indicates that the rate of the signal source Ss is an invalid rate (i.e., the small form-factor pluggable transceiver 100 is not properly matched with the cable 200A so that the bandwidth indication pin 2A is the low voltage level), the detection pin 3A adjusts its own voltage level to a second voltage level, for example, but not limited to a high voltage level. The second connection port 4 is coupled to the transceiver unit 3, and is used for connecting with the network device 300 so that the transceiver unit 3 and the network device 300 bidirectionally transmit the Ethernet frame.

When the detection pin 3A adjusts its own voltage level to the first voltage level, the transceiver unit 3 operates in a normal state and normally performs data/signal transmission and reception. On the contrary, when the detection pin 3A adjusts its own voltage level to the second voltage level, the transceiver unit 3 operates in an abnormal state and cannot normally transmit and receive data/signals. In particular, the first voltage level of the detection pin 3A is, for example, but not limited to less than 0.8 volts, and the second voltage level thereof is, for example, but not limited to greater than 2.4 volts.

The main purpose and effect of the present disclosure is that the detection pin 3A is coupled to the ground point GND, and when the copper cable is used to connect with the small form-factor pluggable transceiver 100, the bandwidth indication pin 2A indicates that the rate is invalid based on the signal source Ss being a cooper cable-type signal source (the rate of which is usually lower than 10 Gbps), and the detection pin 3A provides the first voltage level based on the invalid rate due to being grounded by a resistor R (i.e., it should have been adjusted to the high voltage level, but was forced to the low voltage level due to being grounded). Therefore, although the transceiver unit 3 is a PHY transceiver chip (i.e., the network physical layer transceiver chip), since the detection pin 3A is coupled to the ground point GND, the network physical layer transceiver chip is compatible with the cooper cable-type signal source.

Therefore, the small form-factor pluggable transceiver 100 that was not suitable for the copper cable can be changed to have the function of supporting copper cable transmission, and the original function of using the optical fiber cable for optical communication applications is still retained. On the other hand, compared with the fiber optic cable, the copper cable is less prone to breakage and have a stronger structure, and the price is also relatively cheap. Therefore, compared with the conventional packaged pluggable transceiver, the present disclosure can reduce the configuration cost of the entire network system and increase the system reliability. In one embodiment, the small form-factor pluggable transceiver 100 further includes the resistor R, and the resistor R is coupled between the detection pin 3A and the ground point GND to limit a current flowing from the detection pin 3A to the ground point GND, thereby avoiding the situation that the chip fails due to exceeding the withstand current of the pin.

Figure 3A:
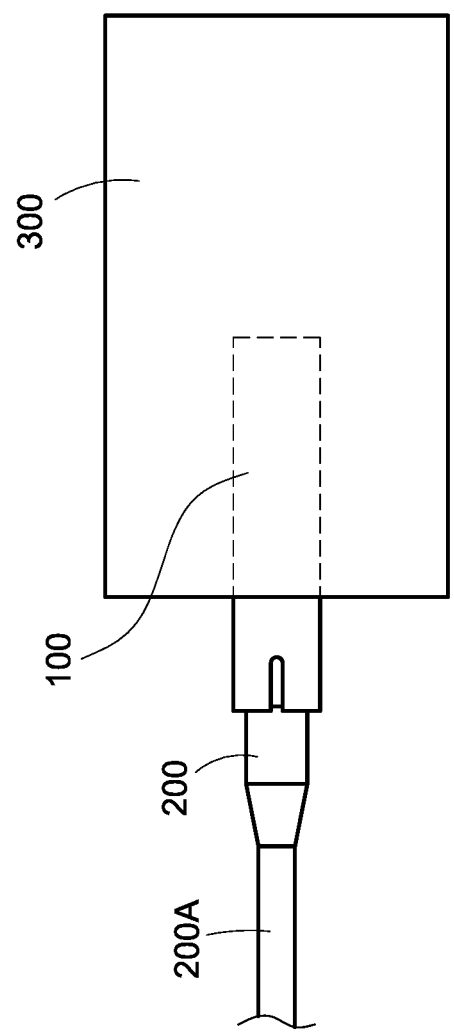
FIG. 3A is a schematic configuration diagram of the small form-factor pluggable transceiver according to a first embodiment of the present disclosure.
Figure 3B:
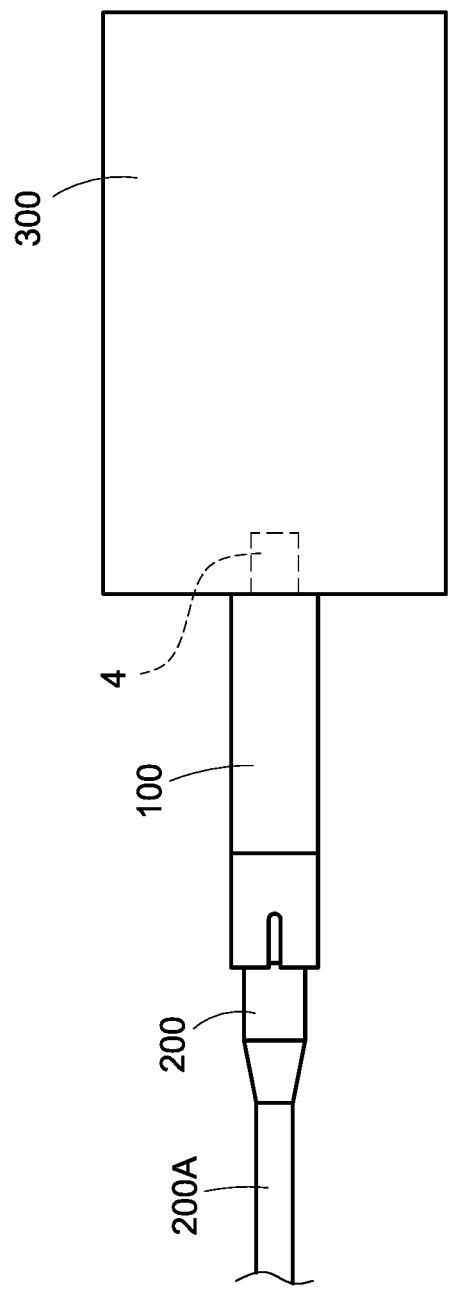
FIG. 3B is a schematic configuration diagram of the small form-factor pluggable transceiver according to a second embodiment of the present disclosure.

Please refer to FIG. 3A, which shows a schematic configuration diagram of the small form-factor pluggable transceiver according to a first embodiment of the present disclosure, and please refer to FIG. 3B, which shows a schematic configuration diagram of the small form-factor pluggable transceiver according to a second embodiment of the present disclosure, and also refer to FIG. 1 and FIG. 2. In FIG. 3A, the small form-factor pluggable transceiver 100 is located inside the network device 300. Since the small form-factor pluggable transceiver 100 and the network device 300 are modularly designed, the user only needs to use the cable 200A to plug the network device 300. In FIG. 3B, the small form-factor pluggable transceiver 100 is independently located outside the network device 300, and therefore the user can adjust the configuration of the small form-factor pluggable transceiver 100 and the cable 200A based on the requirements of the network device 300.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A small form-factor pluggable transceiver with support for copper cable transmission, configured to couple to a copper cable connector and a network device, and the small form-factor pluggable transceiver comprising:

a first connection port, configured to connect to the copper cable connector, and transmit and receive a copper cable-type signal source provided by the copper cable connector, a conversion unit, coupled to the first connection port, and configured to convert the copper cable-type signal source into an Ethernet frame, the conversion unit comprising:

a bandwidth indication pin, configured to indicate a rate of a signal source of an optical cable, and configured to be unable to indicate the rate of the copper cable-type signal source and be a low voltage, a transceiver unit, coupled to the conversion unit, and configured to bidirectionally transmit the Ethernet frame, the transceiver unit comprising:

a detection pin, coupled to the bandwidth indication pin, and configured to be adjusted to a first voltage level based on that the rate is a valid rate and to be adjusted to a second voltage level based on the low voltage level, and a second connection port, coupled to the transceiver unit, and configured to connect with the network device, wherein the transceiver unit operates in a normal state based on providing the first voltage level by the detection pin, and operates in an abnormal state based on providing the second voltage level by the detection pin; the detection pin is coupled to a ground point, so that when the bandwidth indication pin is at the low level based on the signal source being the copper cable-type signal source, the detection pin provides the first voltage level by being coupled to the ground point.

2. The small form-factor pluggable transceiver as claimed in claim 1, further comprising:

a resistor, coupled between the detection pin and the ground point, and configured to limit a current flowing from the detection pin to the ground point.

3. The small form-factor pluggable transceiver as claimed in claim 1, wherein the transceiver unit is a network physical layer transceiver chip, and the transceiver unit is configured to receive the copper cable-type signal source based on the detection pin being coupled to the ground point.

4. The small form-factor pluggable transceiver as claimed in claim 1, wherein the conversion unit is a port physical layer chip.

5. The small form-factor pluggable transceiver as claimed in claim 1, wherein the rate of the cooper cable-type signal source is less than 10 Gbps, and the valid rate is greater than 10 Gbps.

6. The small form-factor pluggable transceiver as claimed in claim 1, wherein the first voltage level is less than 0.8 volts, and the second voltage level is greater than 2.4 volts.

7. The small form-factor pluggable transceiver as claimed in claim 1, wherein the first connection port is an RJ-45.

8. The small form-factor pluggable transceiver as claimed in claim 1, wherein the copper cable connector is coupled to a copper cable or a twisted pair copper cable.

9. The small form-factor pluggable transceiver as claimed in claim 1, wherein the network device is a router or a switch.

10. The small form-factor pluggable transceiver as claimed in claim 1, wherein the small form-factor pluggable transceiver is located inside the network device, or is located outside the network device.

\* \* \* \* \*